United States Patent
Chin et al.

(10) Patent No.: US 7,933,396 B2
(45) Date of Patent: Apr. 26, 2011

(54) REMOTE CONTROL OF CPE-BASED SERVICE LOGIC

(75) Inventors: Bernard Chin, Calgary (CA); Brian Buckler, Calgary (CA); Sandro Cianci, Montreal (CA)

(73) Assignee: Nortel Networks Limited, Mississauga, Ontario (CA)

( * ) Notice: Subject to any disclaimer, the term of this patent is extended or adjusted under 35 U.S.C. 154(b) by 844 days.

(21) Appl. No.: 10/856,163

(22) Filed: May 28, 2004

(65) Prior Publication Data

US 2004/0218733 A1  Nov. 4, 2004

Related U.S. Application Data

(62) Division of application No. 09/404,043, filed on Sep. 23, 1999, now Pat. No. 6,744,867.

(51) Int. Cl.
 *H04M 3/42* (2006.01)
(52) U.S. Cl. .............................. 379/207.02; 379/201.01
(58) Field of Classification Search ............. 379/207.02, 379/142.06, 201.01
See application file for complete search history.

(56) References Cited

U.S. PATENT DOCUMENTS

| | | | | |
|---|---|---|---|---|
| 4,893,335 | A * | 1/1990 | Fuller et al. | 379/200 |
| 5,404,396 | A * | 4/1995 | Brennan | 379/201.05 |
| 5,715,308 | A * | 2/1998 | Shankarappa | 379/373.02 |
| 6,310,944 | B1 | 10/2001 | Brisebois et al. | |
| 6,337,898 | B1 * | 1/2002 | Gordon | 379/67.1 |
| 6,377,668 | B1 | 4/2002 | Smock et al. | |
| 2007/0253543 | A1 * | 11/2007 | Horne | 379/142.06 |

* cited by examiner

*Primary Examiner* — Rasha S Al Aubaidi
(74) *Attorney, Agent, or Firm* — Mintz, Levin, Cohn, Ferris, Glovsky and Poepo, P.C.

(57) ABSTRACT

Telephone network service logic relating to calls over the telephone network to a customer terminal, uses both terminal functions and network functions. The terminal has a service logic script for execution at the terminal to control the terminal functions. To control the execution of this script remotely from the network, a script-control message is determined and sent over the telephone network to the terminal. This may use the GR30 message format, with an additional call qualifier specific to the terminal service logic script, and the type of control being requested, e.g., start execution or terminate the script. This enables the reliability of the interaction between the service logic at the network side, and the service logic script at the terminal to be improved. This enables announcement type services to be provided in which a loudspeaker on the terminal can be remotely controlled to make verbal announcements without requiring customer action to lift a receiver.

12 Claims, 12 Drawing Sheets

REMOTE CONTROL OF CPE-BASED SERVICE LOGIC

CROSS-REFERENCE TO RELATED APPLICATIONS

This application is a divisional of U.S. patent application Ser. No. 09/404,043, filed Sep. 23, 1999, now U.S. Pat. No. 6,744,867 which claims priority from Canadian Patent Application No. 2,254,258, filed Nov. 18, 1998.

FIELD OF THE INVENTION

The invention relates to methods and systems for operating telephone network service logic, and more particularly to conveying information regarding external events, such as incoming calls, to a telephone subscriber without intervention by the subscriber.

BACKGROUND OF THE INVENTION

Known Customer Premises Equipment (CPE) or customer terminals for using telephone networks may be capable of a range of functions such as:
1) causing an indicator light to go on or off,
2) making the terminal go on- or off-hook,
3) dialing and setting up an outgoing call automatically,
4) switching a speakerphone on or off,
5) making the display show some downloaded data,
6) making the display show some soft keys, and
7) sending an indication of a soft keypress to the network.

Such terminals are typically designed for use with the well known ADSI (Analog Display Services Interface) protocol for transmitting voice and data over telephone networks. This is used widely for enhanced services such as home banking and directory services. Such services involve the customer initiating a call to the service provider's server, which can then download menus of choices and data for display. The server may control terminal function to the extent of dictating what is displayed and/or heard by the customer. Detailed descriptions of such terminals, such services, such scripting languages, and the GR-30 message format for sending scripts to terminals, are widely available and need not be repeated here. The GR-30 message format is published in a Bellcore specification.

It is also known to remotely trigger individual terminal functions, e.g. from a local switch in the telephone network, by sending a control message to the terminal which the terminal interprets to perform a particular function. One example of this is the MWI (Message Waiting Indicator) message transmitted in a GR-30 standard message which can be used to switch on an indicator on the terminal. This extension to GR-30 forms part of another published Bellcore specification, TR-NWT-001401. Another example may occur in call set-up, when a control message may be sent to cause the terminal to display "long distance" for an incoming long distance call. In this case, a call qualifier field in the GR-30 call set up message is used as the control message, and is interpreted in the terminal. This is published in Bellcore specification TR-NWT-000031.

The term "remote control" is intended to encompass not only control of a CPE terminal from a switch located on telecommunication company property, but also from switches such as PBXs (Private Branch Exchanges). These may be located in the same building as the terminals they serve, and are considered as part of the network for present purposes.

Another example of remote control of a terminal function is the GR30 CPEID (Customer Premises Equipment IDentifier) message used for putting the terminal off-hook. This is published in ADSI specification document SR-INS-002461. It is used in SRA (Suppressed Ringing Access) calls which may be used for transmitting data without the telephone ringing and disturbing the customer. This can be useful for utility meter reading, or for downloading software scripts for running at the terminal side as opposed to the network or server side. The switch provides a suppressed ringing access, then a server sends a CPEID message, and then the line is set up for downloading data such as a script. This is useful for addressing a particular terminal where a number of terminals are connected to the same subscriber line. A disadvantage of this particular message is that it needs to include the identity of the individual phone. This information needs to be obtained and stored somewhere, and the correct identity retrieved and incorporated each time such a message is sent, even if there is no need to specify the particular terminal (e.g. if there is only one terminal or if all terminals are to be addressed). This effectively restricts use of the message to services such as script download for which the identity of the phone would be needed.

Bellcore has published techniques for ADSI script management, usually carried out on an ASMS (ADSI Script Management Server) connected to or within the network. This also known as an ACMS (Advanced Call Management Services) server. Also, European patent application 0 841 792 describes some examples of script download, and is hereby incorporated by reference. Some such scripts may be limited to actions which control data flow within a call, e.g. displaying a menu then detecting and sending a soft keypress selection back to the server via a switch. What is displayed at the terminal is controlled remotely by the server. Other scripts involve a sequence of actions which affect the call itself, e.g. putting the terminal off hook or on-hook. This subset of scripts will be referred to as service logic scripts. A call involves at least starting to set up a voice path While such service logic scripts are normally triggered and controlled by customer actions, there exists a mechanism for triggering remotely without customer intervention. Bell-core standard TR-NWT-001273 provides twenty or so possible triggers which can be sent by a switch, to cause a service logic script on a terminal to start or cease. Examples of these triggers include a normal ring, a special ring, a normal dial tone after the terminal goes off-hook, and a stutter dial tone after a terminal goes off-hook. In each case, a sequence of line states or telephony signaling events is used to trigger the service logic script.

Some limitations in these known methods have now been appreciated:
1) The reliability of correct detection of such line states or signaling events is limited by terminal hardware limitations and by line quality considerations.
2) Even if correctly detected, there is a chance that the given state or signaling event could conceivably arise in the course of normal call (as opposed to service specific call) processing, and not be intended as a service logic script trigger.
3) The number of different events or states is limited, hence the number of service logic scripts which may be used is limited. Or, if the same state or event is used in more than one service logic script, there is a risk of interference between different service logic scripts, when they are run simultaneously. The number of events is limited by the standard and because typically the capability of the local switch to generate such events or states is fixed in hardware and thus difficult or expensive to expand or change. If there is more than one service running, or more than one service to which a detected event or signaling state could apply, the terminal would have to make an assumption of some kind to resolve the ambiguity, or be limited to running one service at a time. The service designer must either know and take account of the assumptions, or must design the services to avoid ambiguities arising, which is difficult, if not impossible.

It is also known to send a GR30 call set up message to a terminal when a call is already in progress. The terminal may be arranged to interpret this as a command to start a SCWID (Spontaneous Call Waiting with IDentification) service script. In this case the limitation 1) mentioned above is overcome, but limitations 2) and 3) remain.

It is also known to use a script time-out mechanism in the terminal, to terminate service logic at the terminal after a given time, unless there is some user intervention to reset the timer. Although this can address limitation 1) mentioned above to improve the reliability of service logic termination, it may result in premature or delayed termination, and does not address any of the limitations in relation to initiating or controlling service logic.

SUMMARY OF THE INVENTION

According to a first aspect of the invention there is provided a method of operating telephone network service logic relating to a call over a telephone network to a customer terminal, the service logic involving both terminal and network functions, the terminal being arranged to recognize control messages, and having terminal service logic scripts for execution at the terminal to control the terminal functions, the method comprising the steps of:

determining a script control message for controlling remotely the execution of one of the terminal service logic scripts at the terminal, the script control message specifying to which of the scripts it relates; and controlling remotely the execution by sending the script control message over the telephone network to the terminal.

Compared to the prior art Bellcore specification which uses signaling events or line states to trigger terminal scripts, sending a control message for controlling the terminal service logic script enables better interaction between service logic at the network side and the service logic script at the customer terminal. In particular, limitation 1) mentioned above and relating to reliability can be addressed. In relation to the prior art use of a control message by the SCWID service, limitations 2 and 3 mentioned above are also addressed since the control message specifies to which script it relates. In relation to the prior art remote control of individual terminal functions the invention enables, the service logic at the network side can be simplified and run more efficiently for multiple customers. Scripts containing multiple functions are controlled remotely, compared to controlling individual terminal functions with individual control messages. This is particularly significant for large networks and for delay sensitive services.

Also, it has now been appreciated that the consequences of incorrect interaction between service logic at the network side and the terminal side can be more serious and harder to foresee than incorrect triggering of a simple terminal function. At worst, a call which is not terminated when commanded could disrupt service or cause unwanted call charges to be billed. Accordingly, reliability is key for many types of service to be introduced. This can now be managed and without relying on the service designer needing to anticipate and avoid the above mentioned interference between services.

For example, if the same type of control message could be used by more than one type of service logic script, this would enable the terminal to establish which script it relates to. Also, if multiple scripts of the same type are run simultaneously, this may enable independent control of each of them.

It is thus an object of the present invention to operate service logic relating to an incoming call over a telephone network to a terminal by sending a script control message to the terminal for controlling the selection and operation of scripts previously loaded into said terminal.

It is another object of the invention that the script control message is part of a GR-30 standard message. An advantage of using this well established standard is that many installed switches and terminals use it, and it has proven reliable.

It is another object of the present invention that the control message uses a call qualifier field of the GR-30 standard message. An advantage of this is that it is a part of the GR-30 standard which is suitable for expansion with minimum changes being needed at either the switch or the terminal.

It is another object of the present invention that it be usable with a terminal which supports the ADSI protocol. An advantage of using such terminals is that ADSI capabilities, such as display and softkeys in particular, combine well with the remote control mechanism of the invention to enable a wider range of services to be offered.

It is another object of the present invention that the service logic is responsive to events outside the telephone network. An advantage of this is that a wider range of services can be offered if the service can make use of such events.

It is another object of the present invention that the control message is determined and sent from a server which is coupled to the network by a telephone line. This enables services to be offered and administered by third parties, independent of the telephone network.

It is another object of the present invention to provide operation of service logic in which the service logic initiates a call to the customer terminal, and the script control message is sent to the terminal during call set-up. An advantage of this is that it enables services to be created without requiring their intervention even to answer the call. By sending the control message during call setup, the service can specify how the call is to be answered by the terminal. Such services may be used for alerting customers, for example.

It is another object of the present invention that the terminal service logic script comprises the step of alerting the customer by voice without requiring customer action. An advantage of this is that it enables a customer to be alerted without his having to take the usual step of lifting a receiver or pressing a button to accept a call. This may be useful to ensure that urgent calls are not missed. Preferably the alerting by voice comprises spoken information relating to or descriptive of the call. This enables a customer to make an informed decision of whether to take the call.

It is another object of the present invention that the terminal service logic script comprises the step of taking the terminal off-hook without first checking at the terminal that a terminal identity sent with the control message matches a pre-assigned terminal identity. An advantage of this is that the service can operate with any terminal without the administrative burden of maintaining a record of the terminal identity of every terminal.

It is another object of the present invention to be used with a terminal comprising a loudspeaker, the terminal service logic script comprising the step of coupling the loudspeaker to a voice path of the call over the network. An advantage of this is that it enables useful services which use the loudspeaker and which can be remotely controlled. This can include public address type services, or alerting or paging services.

It is another object of the present invention that the service logic comprises the step of alerting the customer, by a voice message over a loudspeaker of the terminal, of the occurrence of a predetermined event. An advantage of this is that the customer need not initiate a call, nor even answer a call, as long as they are within earshot of their terminal. Thus they need not interrupt their current activity any longer than is needed to listen to the information in the voice message. Preferably the predetermined event comprises an event occurring in a computer system coupled to the telephone network.

The present invention thus overcomes some of the disadvantages of computer systems including, for example, email applications, which make them poor at alerting customers to events. Typically they can alert a recipient of a message only by an indication on the recipient's screen, and by a tone. Urgent messages may not reach a customer who is not online, or if the customer does not interrupt their current activity to check the content of the messages. Screen messages may be occluded by other windows on the screen. If many less important messages are being received, it may be inconvenient to check the content of all of them. A terminal for a telephone network is normally available for receiving calls all the time, and a verbal message can contain more information to help a customer to decide whether to respond immediately.

It is another object of the present invention that the remote control of the terminal script is made dependent on criteria selected by the customer. This helps to broaden the range of services which can be created. Selection by the customer can improve security, prevent nuisance calls, or can enable a customer to prioritize calls and allow remote control only to selected callers.

Another aspect of the invention provides a method of paging a customer by using a customer terminal coupled to a telephone network, the terminal being arranged for handling voice calls over the telephone network, and having a loudspeaker, the method comprising the steps of:

initiating a call over the telephone network to the terminal, sending a control message to the terminal to cause the terminal to go off-hook, and to use the loudspeaker to alert the customer.

Another aspect provides apparatus corresponding to the method of the first aspect.

Another aspect provides software stored on a computer readable medium for carrying out the method of the first aspect.

According to another aspect of the invention, there is provided a customer terminal for use with the above aspects of the invention, for receiving a control message and executing the script according to the control message.

Another aspect provides a method of using the customer terminal of the preceding aspect for receiving a control message and executing the script according to the data message.

Another aspect provides software stored on a computer readable medium for carrying out the method of using a customer terminal of the preceding aspect.

Another aspect provides a method of programming a computer to operate according to the method of the first aspect.

Another aspect provides a method of programming a terminal to operate according to the aspect set out above.

Any of the preferred features may be combined with any of the aspects set out above as would be apparent to a skilled person.

Other advantages will be apparent to a skilled person, particularly in relation to any further prior art other than that discussed above.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

Embodiments of the invention will now be described in more detail by way of example, with reference to the accompanying drawings, in which.

DETAILED DESCRIPTION

Figure 1:
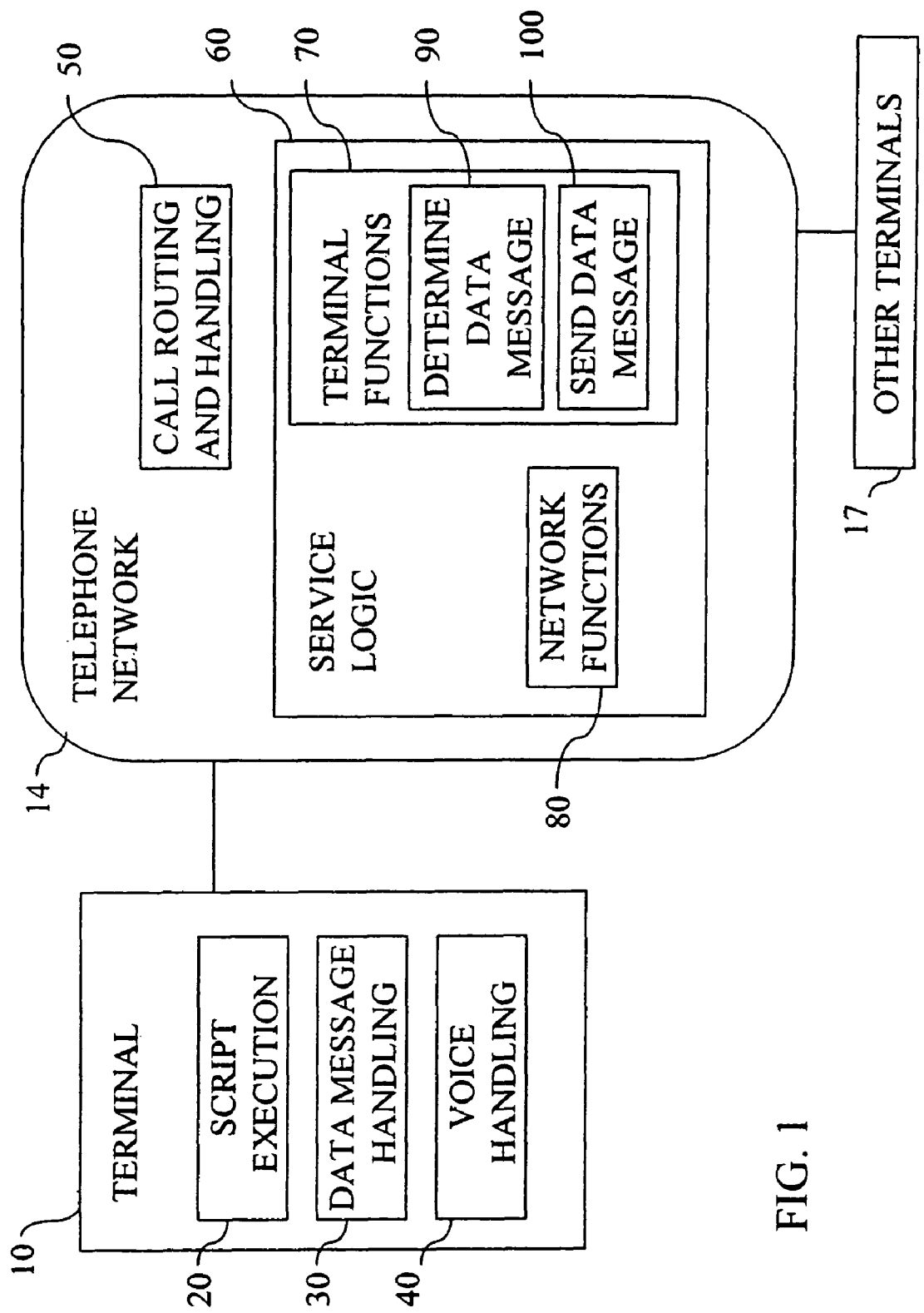
FIG. 1 shows an embodiment of the invention in schematic form.

FIG. 1 shows in schematic form an embodiment of the invention including a customer terminal 10 coupled to a telephone network 14. Other terminals 17 are also connected to the network. The customer terminal 10 includes functions for executing service scripts 20 at the terminal, for receiving and interpreting control messages 30 from the network, and for handling voice calls sent over the network. The other terminals may be similar or may have only the voice handling capabilities. Control messages are typically transmitted by means of FSK.

The network 14 includes call handling and routing capabilities 50 and service logic functions 60. The service logic functions may be implemented on a processor located externally or internally to the network. In practice they are likely to be implemented either on a local switch or on an external server coupled to the network. The service logic includes network functions 80 and terminal functions 70. The terminal functions include the functions of determining and sending a control message 90. The function of determining a control message can be carried out by a processor retrieving a message from memory or by generating the message according to input parameters.

Figure 2:
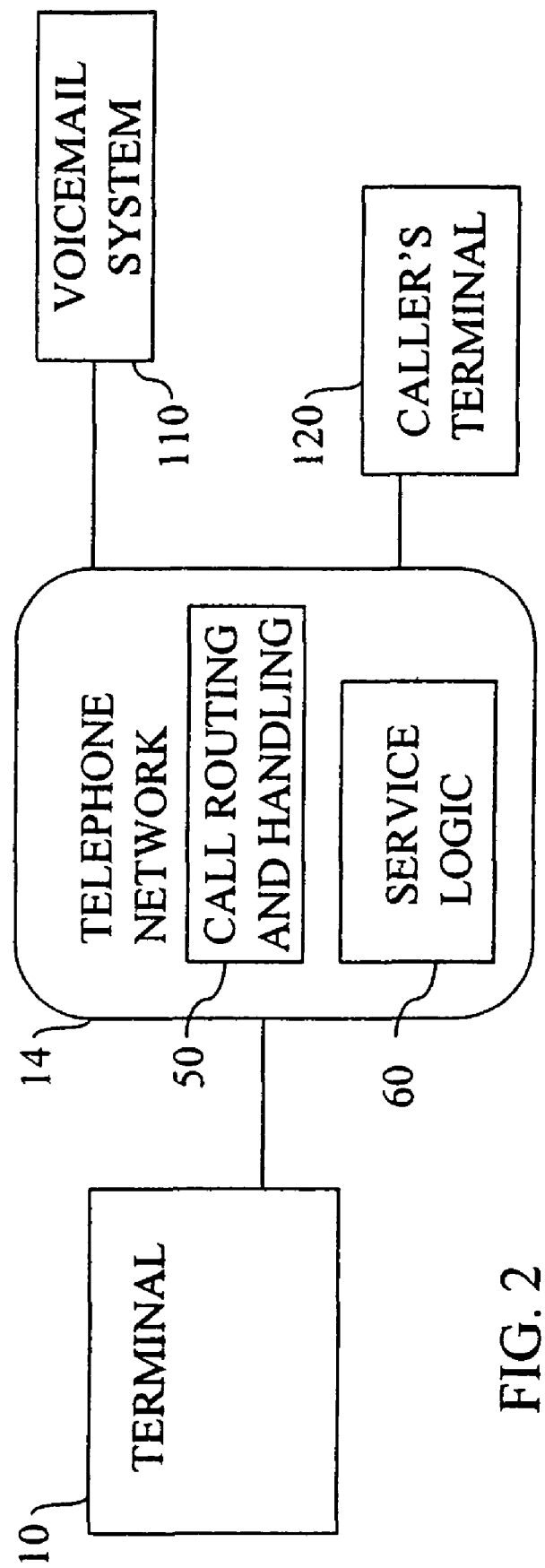
FIG. 2 shows another embodiment of the invention in schematic form, showing elements used for services such as a Call Screening Monitor Intercept (CSMI) service.

FIG. 2 shows an arrangement including a voicemail system 110. The voicemail system is coupled to the telephone network, or may be part of the telephone network. An example of a service making use of the voicemail system will be described below with reference to FIGS. 5 to 7. FIG. 2 also shows a caller's terminal 120 coupled to the telephone network. Otherwise the terminal 10 and the telephone network 14 can be as shown in FIG. 1.

Figure 3:
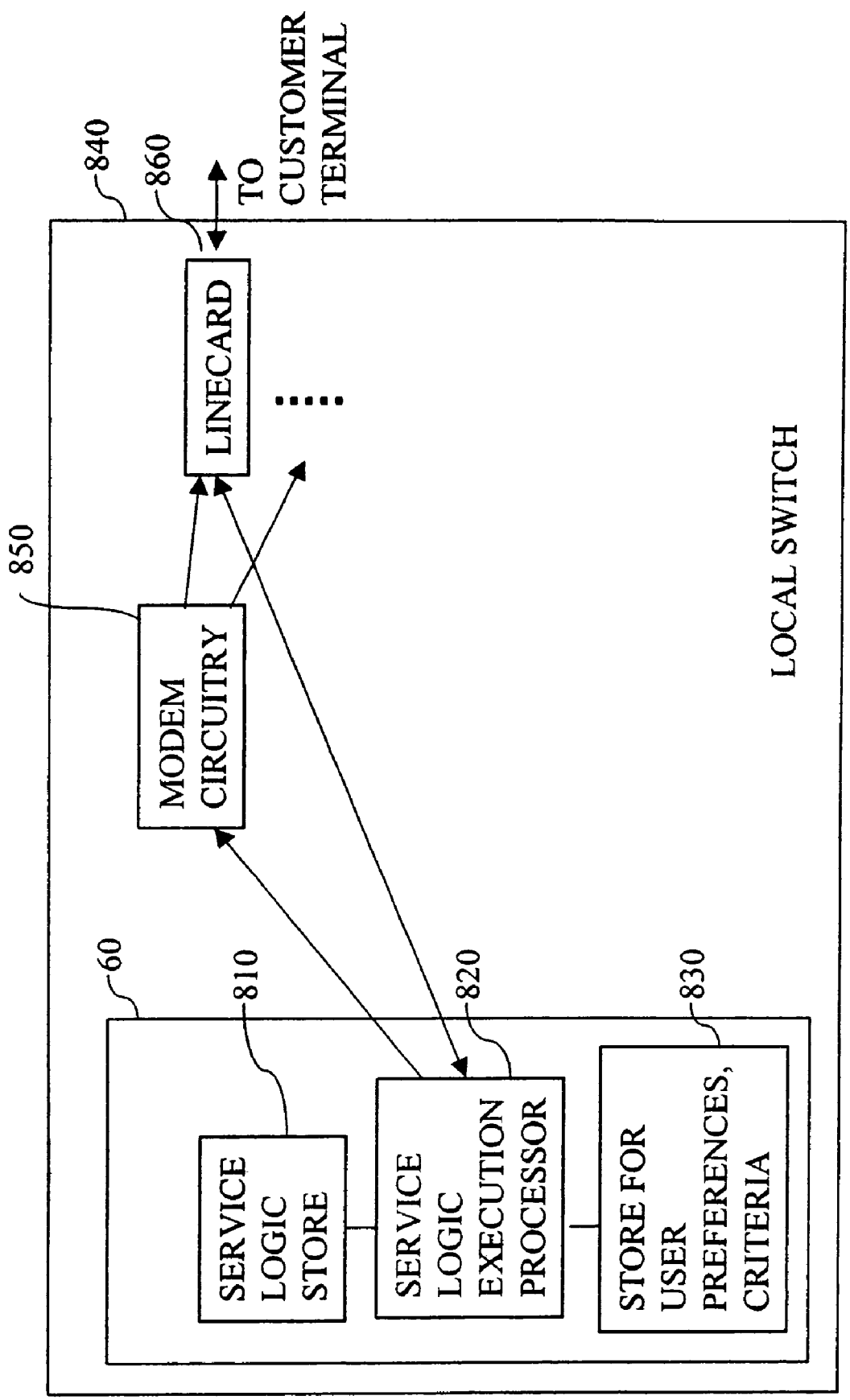
FIG. 3 shows in more detail in schematic form some of the elements of a local switch of the network shown in FIG. 2.

Local Switch Elements, FIG. 3

FIG. 3 shows some of the elements of the telephone network in more detail, in schematic form. In this case the service logic may be implemented on a central processor of a local switch 840. The service logic function 60 includes a number of functions represented by a service logic execution processor 820, a service logic store 810, and a store 830 for user preferences and criteria. The latter may also store a record of which services a user has subscribed to.

In a local switch 840, modem circuitry 850 is provided for generating and supplying control messages in the appropriate format as a modem burst to be sent to one or more of the numerous subscriber lines served by the switch. In some applications, the control message can be generated elsewhere and fed to the call path somewhere other than the local switch. Each customer terminal is connected by a subscriber line to a line card 860 in the local switch. Typically the modem circuitry, in the form of multiple modems on a single, card serves hundreds of line cards. This may make it imperative to implement services with as few control messages as possible, so that the local switch modem circuitry is not so overloaded that control messages have to be queued and thus delayed. The service logic execution processor would determine the type of control message and the content of the fields, and pass it to the modem circuitry with an indication of which subscriber line or lines it is to be sent over. The modem circuitry would incorporate it into a modem burst and send it on the given subscriber lines. This can be done at specific times during call setup, or while a call is in progress.

The service logic execution processor is also shown coupled to the line card of the local switch to illustrate schematically that the service logic execution processor needs to be aware of the state of the line, receive inputs from the terminal, and be able to control the state of the line. There would be other circuitry (not shown), for achieving such functions which can be implemented following well-established practice and so need not be described in more detail here. Reference is made to well known switches such as Nortel Networks DMS switches.

Figure 4:
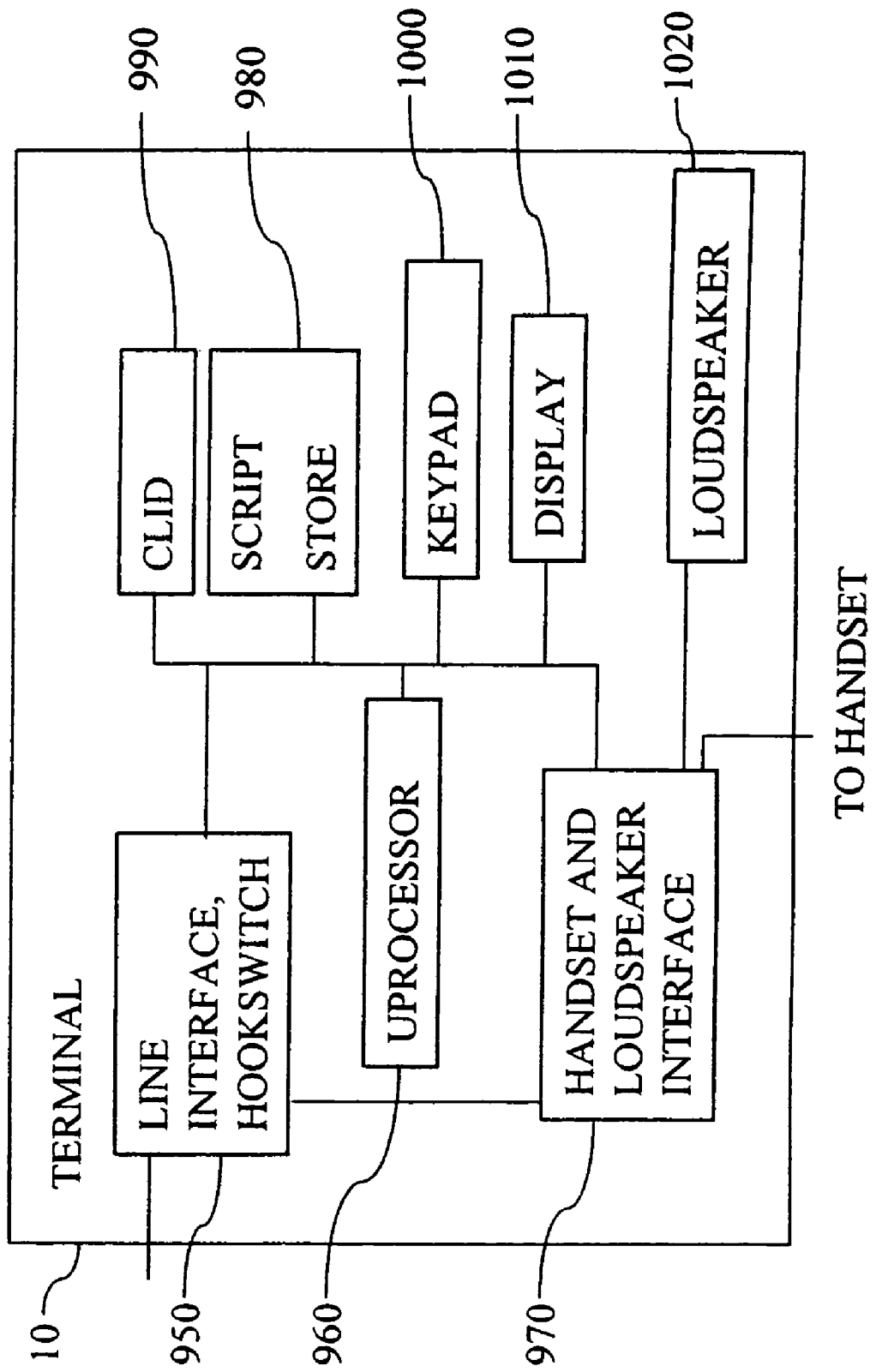
FIG. 4 shows an arrangement of a terminal shown in FIG. 2.

Terminal Elements, FIG. 4

FIG. 4 illustrates some of the principal elements of the customer terminal 10. It includes a line interface and electric hook switch 950, a script store 980, and a CLID (Calling Line Identification) processing element 990 including detection hardware. A keypad 1000, a display 1010, and a loudspeaker 1020 are also provided. All these elements, and a handset and loudspeaker interface 970, are coupled to and controlled by a microprocessor 960. These hardware elements may be identical to a conventional terminal, or the distinctive features of the terminal may be entirely contained in the software for the control microprocessor. If the terminal is arranged to support the ADSI protocol, softkeys would be provided and supported by the processor.

Figure 5:
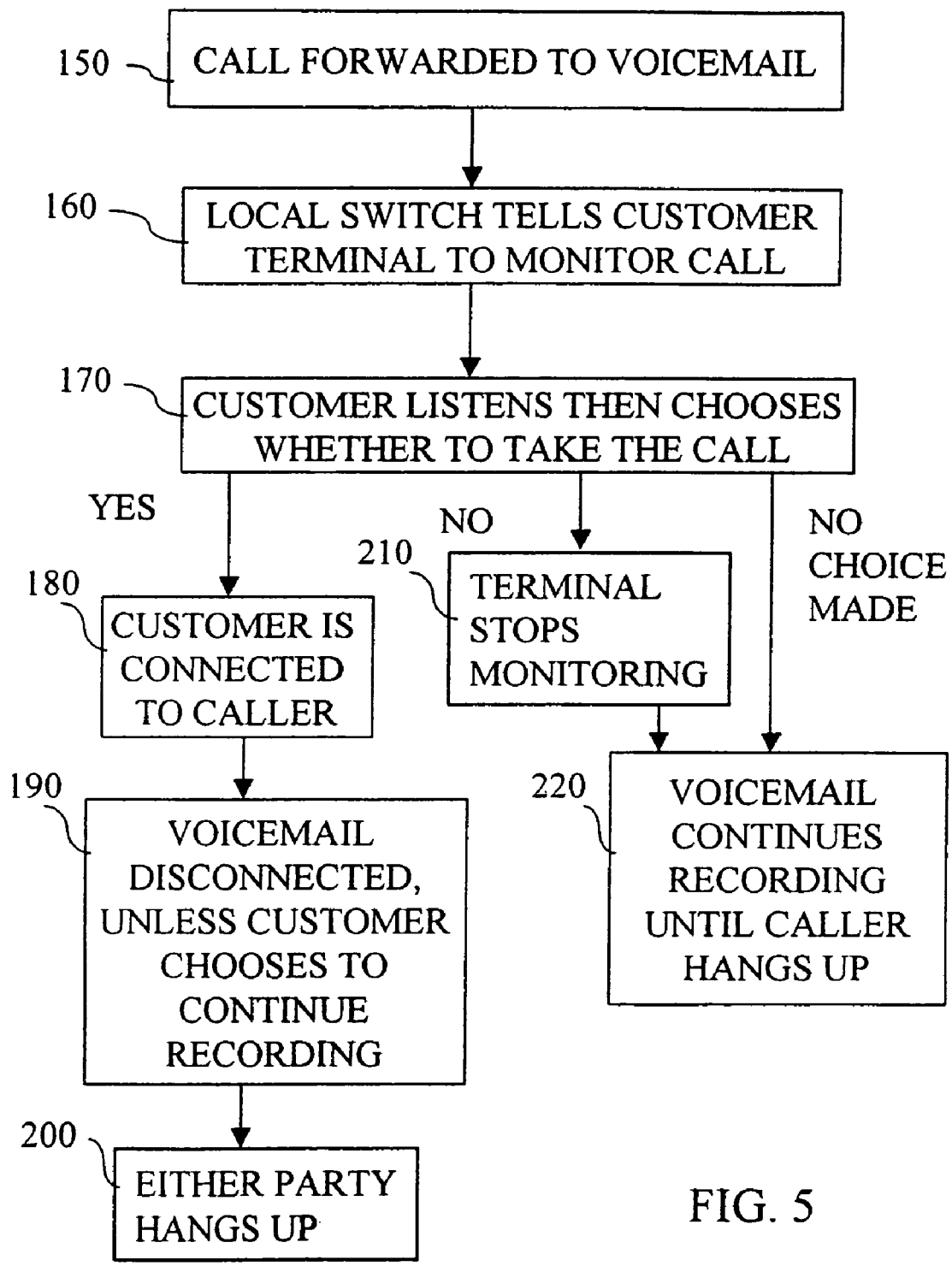
FIG. 5 shows a high level flow chart of the CSMI service of FIG. 2.
Figure 6:
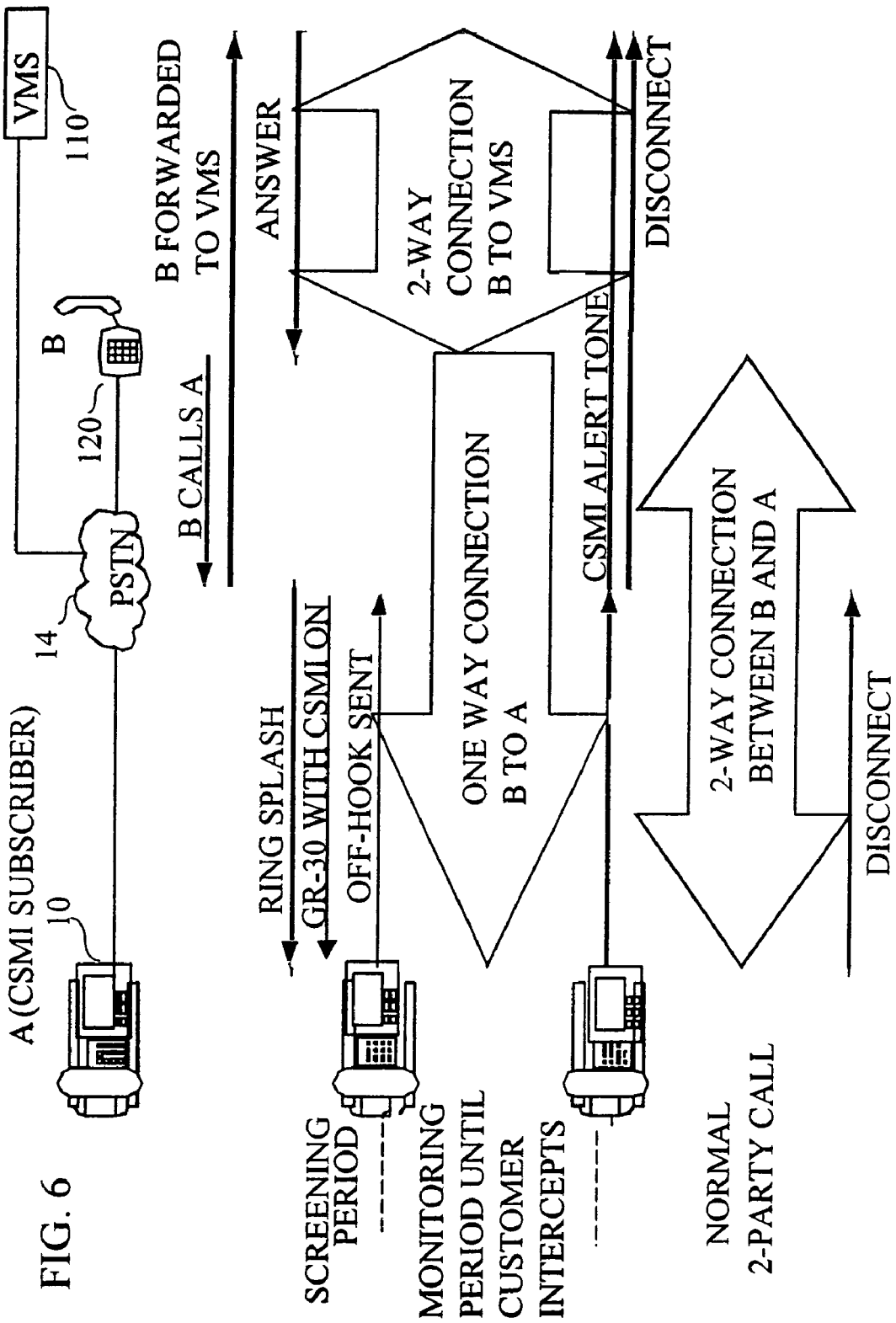
FIG. 6 shows a sequence chart of the embodiment of FIG. 2, for the case that the monitored call is taken.
Figure 7:
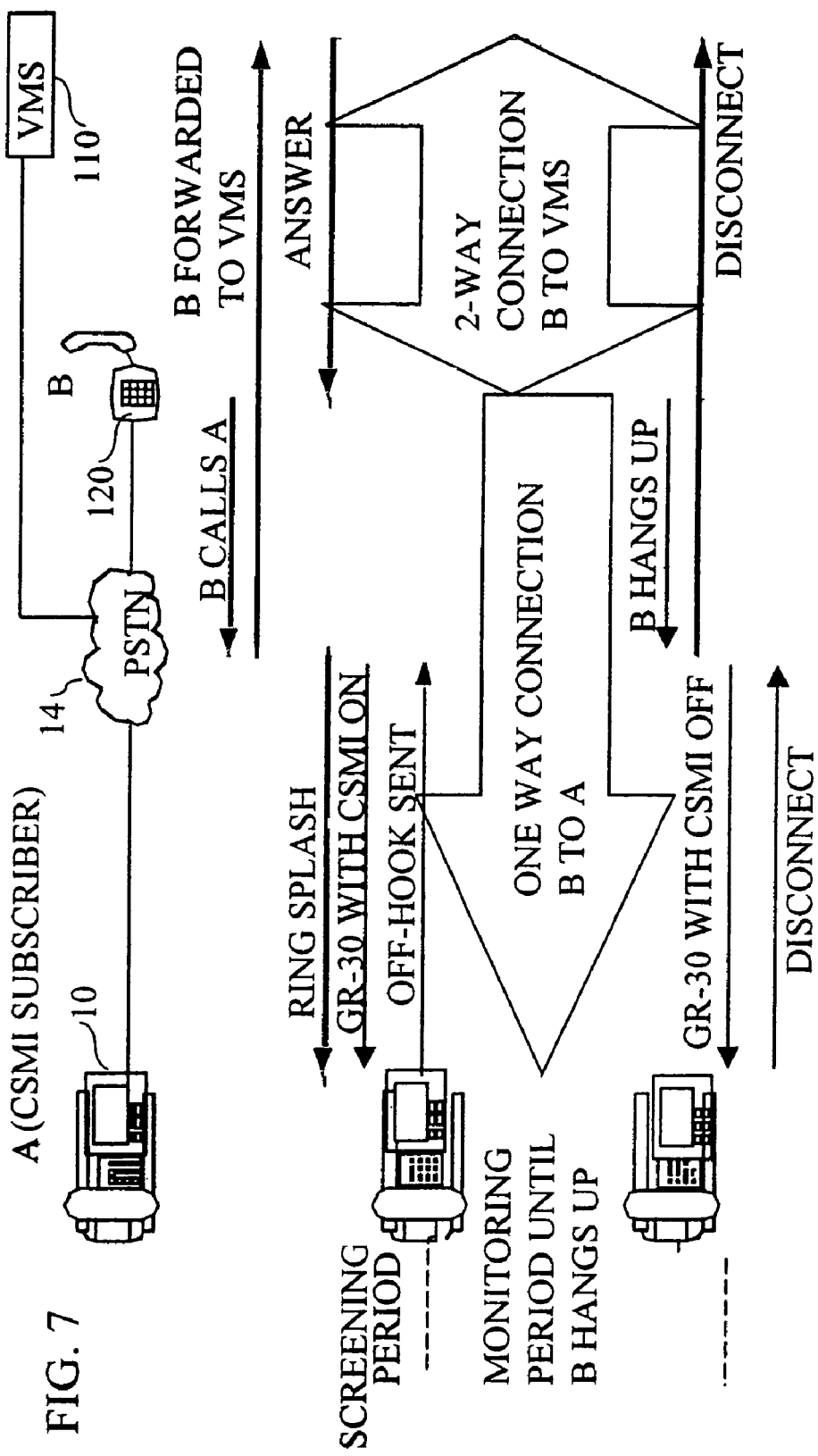
FIG. 7 shows another sequence chart of the embodiment of FIG. 2, for the case that the monitored call is not taken.

CSMI Example, FIGS. 5 to 7

FIG. 5 shows a flowchart of a CSMI service for enabling a customer to monitor calls as they are recorded by a voicemail system. Conventionally this has been found to be a valuable facility which is always provided on CPE answering machines but it has not been possible to provide it on network-based voicemail systems. The service shown in FIG. 5 can make use of the arrangement of FIGS. 2, 3, and 4. At step 150 an incoming call is received and diverted by the network to the network voicemail system 110. At step 160 it is determined that the called party is a CSMI subscriber, e.g., by the local switch, as a preliminary step before starting the appropriate service logic. Under the control of the CSMI service logic the local switch sends a specific control message to instruct the customer terminal to begin monitoring the call. The control message will be described in more detail below. At 170, the customer can listen to the caller starting to leave a message without having to pick up the phone or take any action. The customer can choose whether to take the call and speak to the caller, or to end the monitoring, or do nothing in which case the call continues to be monitored.

At 180, if the customer chooses to take the call, the network connects the customer to the caller. At 190 the voicemail system is disconnected unless the customer has chosen to continue recording the call. The call continues until either party hangs up at 200. If the customer chooses to stop the monitoring at 210, e.g., by pressing a button on his terminal, the customer's line and his terminal are no longer coupled to the call, and the voicemail continues recording at 220 until the caller hangs up. If the customer takes no action or the terminal is unattended, the voicemail continues recording and the terminal continues monitoring, until the caller hangs up.

An example of a further service which might be run simultaneously is the well known SCWID (spontaneous call waiting with caller Identification) service. If another caller calls during monitoring, the SCWID service may start running and the terminal will be sent a control message containing the caller ID and perhaps a caller name. The terminal can be arranged to interrupt the CSMI terminal service and run a SCWID service to extract the caller ID and caller name information and display it. An audible alert may also be given over the loudspeaker. Soft keys may be displayed to enable the user to make a choice of whether to accept the call. The service logic processor in the network will be arranged to distinguish between user choices relating to SCWID and choices relating to CSMI. The terminal may be arranged to return to the CSMI service as appropriate, or effectively run the services in parallel. Any control messages from the network to the terminal can specify which type of service they relate to, to ensure there is no unwanted feature interference. A second instance of the CSMI service could be started before the first one terminates. In this case, the control message might specify which instance of the CSMI service it relates to. In this way, feature interaction can be managed. Alternatively, the terminal could also be arranged so that selected other services, such as the SCWID service, are not run while the CSMI service is active.

The CSMI service is shown in more detail in the sequence charts shown in FIGS. 6 and 7. FIG. 6 shows the example of what happens in such a service for the case where a customer picks up the call. FIG. 7 shows what happens for the case where the customer takes no action. In both figures is shown a schematic representation of the customer terminal 10 for customer "A", a telephone network 14 which may be the PSTN (Public Service Telephone Network), a terminal 120 of a caller "B", and the voice messaging system 110. The sequence of actions of each of these elements is shown starting at the top of the chart. Switching is accomplished by a switch such as switch 840 shown in FIG. 3 and not shown in FIG. 6 or 7.

The CSMI Call Scenario of FIG. 6

This shows an example of a script control data message in the form of a CSMI Activate Call Qualifier as part of a GR-30 Call Setup message. It is used to activate/trigger CSMI Automatic Monitoring at the terminal:

An incoming call is forwarded by switch 860 to CSMI subscriber's Voice Mail System (VMS) 110; VMS 110 answers;

Switch 860 sends CSMI ring splash followed by the GR-30 Call Setup message containing the CSMI Activate indicator call qualifier to subscriber terminal 10;

CSMI Activate indicator call qualifier is detected by the set 10 and triggers the appropriate set function (in firmware in a present embodiment) to provide automatic monitoring (assuming the subscriber has enabled the set 10 auto monitoring functionality);

Set 10 goes off-hook and turns on the speakerphone; message being left is heard over the speakerphone; picking up the handset turns off the speakerphone but does not intercept the call;

Set 10 display is updated with "Intrcpt" and "Exit" softkeys during monitoring mode;

If the CSMI subscriber depresses the "Intrcpt" softkey, set 10 sends a switchhook flash, call is intercepted;

If 2-way CSMI interception is used, the VMS 110 is disconnected resulting in a 2-way call between CSMI subscriber 10 and caller 120; set 10's display is updated accordingly;

If 3-way CSMI interception is used, a "DropVMS" softkey is displayed; conversation between CSMI subscriber 10 and caller 120 is recorded on VMS 110; CSMI subscriber depressing the "DropVMS" softkey prompts set to send a switchhook flash; VMS 110 is disconnected resulting in a 2-way call between CSMI subscriber 10 and caller 120; set 10's display is updated accordingly.

If the CMSI subscriber depresses the "EXIT" softkey, the ADSI set 10 places itself back on-hook and its display is idled (not shown in FIG. 6).

FIG. 7, CSMI Deactivate Example

The CSMI Deactivate Call Qualifier can be used to terminate the CSMI Automatic Monitoring session without user intervention;

Call Scenario;

An incoming call is forwarded by switch 860 to CSMI subscriber's VMS 110; VMS 110 answers;

Switch 860 sends CSMI ring splash followed by the GR-30 Call Setup message containing the CSMI Activate indicator call qualifier to subscriber terminal 10;

CSMI Activate indicator call qualifier is detected by the set 10 and triggers the appropriate set function (firmware) to provide automatic monitoring (assuming the subscriber has enabled the set 10's auto monitoring functionality);

Set 10 goes off-hook and turns on the speakerphone; Message being left is heard over the speakerphone;

Set 10's display is updated with "Intrcpt" and "Exit" softkeys during monitoring mode;

The set 10 is unattended, meaning no end-user intervention occurs;

Caller 120 hangs up when message deposit is complete; VMS 110 is disconnected; switch 860 detects VMS 110's disconnection and sends a GR-30 Call Setup message containing the CSMI Deactivate indicator call qualifier to the set 10;

CSMI Deactivate indicator call qualifier is detected by the set 10; set 10 is returned on-hook, softkey display is cleared, screen display is updated with idle screen (date & time).

Unlike the execution of a script (a complete prestored application), the interpretation of FSK control messages by firmware 30 (FIG. 1) executing in microprocessor 960 (FIG. 4) allows specific and detailed functions to be selected in set 10.

The present CSMI example illustrates taking control of the audio path for a particular purpose. Those skilled in the art will contemplate other specific functions that may be requested remotely and performed in a subscriber set 10.

The GR-30 Call Setup Message

The existing GR-30 Call Setup Multiple Data Message Format (MDMF) message is used to send the new CSMI specific events.

CSMI specific Call Qualifier parameters within the existing GR-30 Call Setup message allow proper activation/deactivation of set functions such as automatic monitoring.

The GR-30 Call Setup message parameter types;

Time & Date

Calling Line Identification (CLID)—calling number

Dialable Directory Number (DDN)—calling number

Reason for absence of DN

Call Qualifier

Name—calling name

Reason for absence of Name

The Call Qualifier Parameter in the GR-30 Message

This parameter provides additional information on a call.

|        | h g f e d c b a        |
|--------|------------------------|
| Byte 1 | Parameter Code         |
| 2      | Parameter Length       |
| 3      | Qualifier              |

Call Qualifier Parameter

The Call Qualifier Parameter Content;

Parameter code is 6 (00000110)

Parameter Length is coded in binary and is always 1 (00000001)

Qualifier is coded in ASCII (no parity) and currently has only two meanings;

L: Long Distance Indicator='01001100'

R: Ringer Test indicator='01010010'(value not currently supported)

New Call Qualifier indicators;

C: CSMI Activate Indicato='01000011'

D: CSMI Deactivate Indicator='01000100'

Note: The new CSMI Qualifier indicators are not yet standardized, so are proprietary.

It is possible for there to be insufficient room in the GR30 message for the call qualifier depending on the total length of other parameters, notably the DDN parameter. Accordingly, a check should be made to ensure the length of the DDN parameter is not such as to prevent the call qualifier from being sent. If this is the case, the CLID parameter should be sent instead of the DDN parameter

| Field Name       | Actual Data | Translation                          |
|------------------|-------------|--------------------------------------|
| Message type     | 10000000    | Call Setup Message                   |
| Message length   | 00100011    | 35 bytes                             |
| Parameter type   | 00000001    | Time parameter (Sept. 18th @ 12:35 pm) |
| Parameter length | 00001000    | 8                                    |
| Data             | 00110000    | 0                                    |
|                  | 00111001    | 9 - month                            |
|                  | 00110001    | 1                                    |
|                  | 00111000    | 8 - day                              |
|                  | 00110001    | 1                                    |
|                  | 00110010    | 2 - hour                             |
|                  | 00110011    | 3                                    |

-continued

| Field Name | Actual Data | Translation |
|---|---|---|
|  | 00110101 | 5 - minute |
| Parameter type | 00000010 | Calling Line Identification (514-765-1234) |
| Parameter length | 00001010 | 10 |
| Data | 00110101 | 5 |
|  | 00110001 | 1 |
|  | 00110100 | 4 |
|  | 00110111 | 7 |
|  | 00110110 | 6 |
|  | 00110101 | 5 |
|  | 00110001 | 1 |
|  | 00110010 | 2 |
|  | 00110011 | 3 |
|  | 00110100 | 4 |
| Parameter type | 00000110 | Call Qualifier |
| Parameter length | 00000001 | 1 |
| Data | 01000011 | CSMI Activate Indicator or |
|  | 01000100 | CSMI Deactivate Indicator |
| Parameter type | 00000111 | Name (John Doe) |
| Parameter length | 00001000 | 8 |
| Data | 01001010 | J |
|  | 01001111 | O |
|  | 01001000 | H |
|  | 01001110 | N |
|  | 00100000 | Space |
|  | 01000100 | D |
|  | 01001111 | O |
|  | 01000101 | E |

Figure 8:
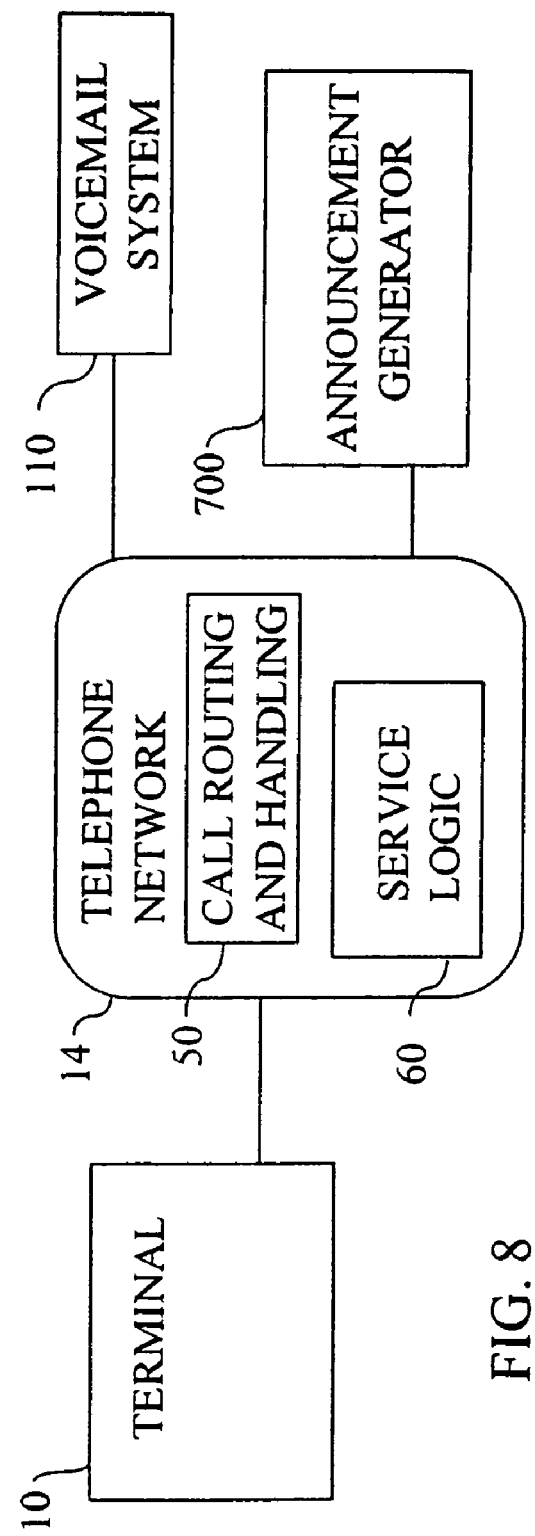
FIG. 8 shows an arrangement of elements for use in services such as alerting or announcing services.
Figure 9:
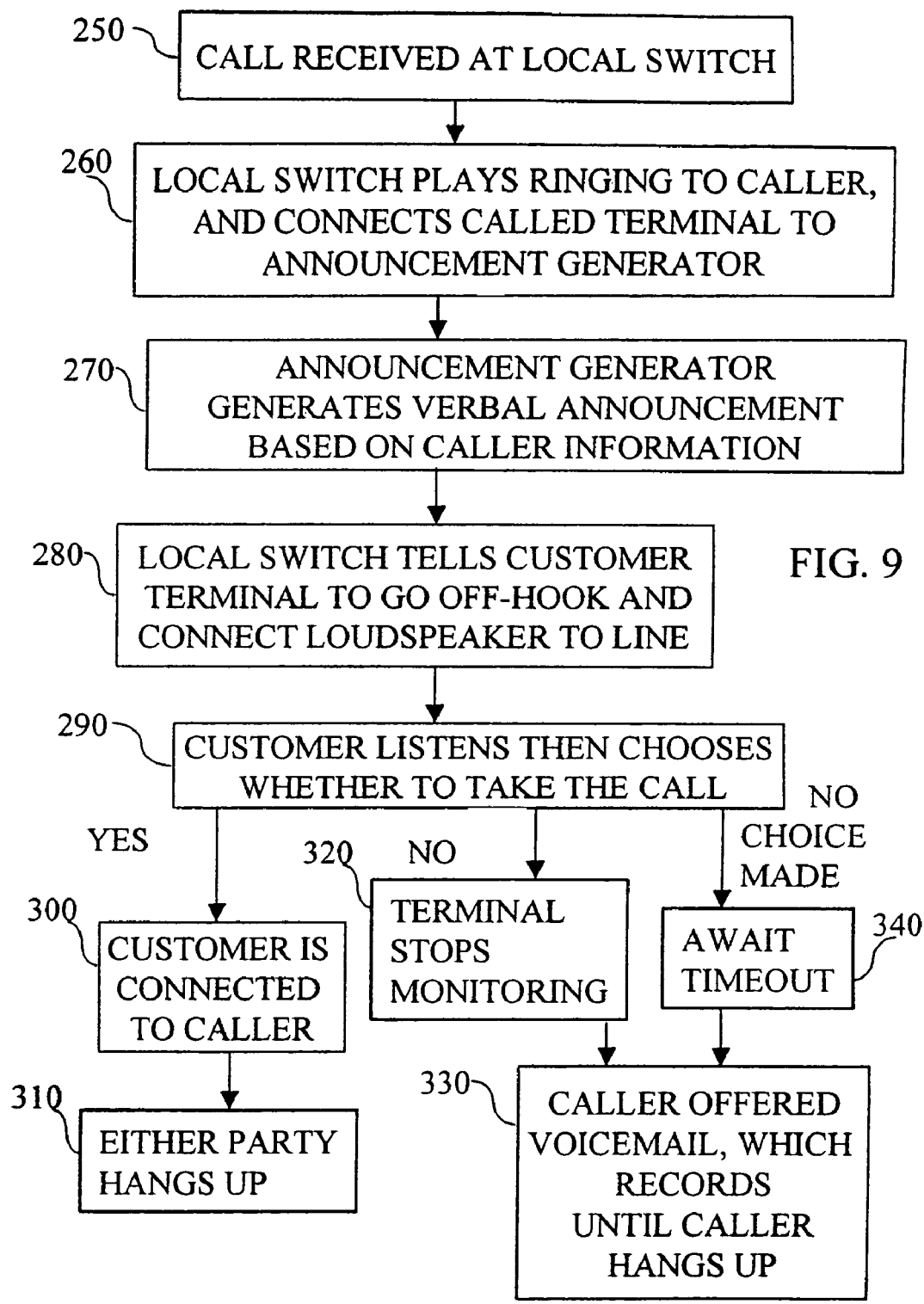
FIG. 9 shows a flow chart of another embodiment, for a caller announce service.

Caller Announce Example, FIGS. 8 and 9

FIG. 8 shows an arrangement of elements similar to FIG. 2, but with the addition of an announcement generator 700. Although service logic 60 is illustrated as being located at the local switch, it could conceivably be located at the announcement generator external to the network. In practice, some service logic may conveniently be provided at the announcement generator. A telephone line connects the announcement generator to the network. Hence calls can be forwarded to the announcement generator, and it can be in the call path and play a part in controlling the call.

As will be described in more detail in relation to FIG. 10 below, the announcement generator is capable of receiving information in electronic form and converting it into a speech signal which can be fed into a voice path of a call to reach the customer's terminal. As this voice synthesis is relatively compute intensive, it is most practical to provide this in a server in or coupled to the network, rather than at each terminal. It is also preferable to provide it directly on the call path, so that it does not suffer degradation e.g. by coding and decoding if it needs to be transmitted some distance to reach the call path. If such difficulties can be overcome, in principle voice synthesis could be carried out anywhere.

FIG. 9 shows a flow chart for another embodiment of the invention which uses the announcement generator shown in FIG. 8. The service provided is a caller announce service which gives a customer verbal information about a caller spontaneously, without the customer needing to take any action other than listen.

At 250, an incoming call is received at the local switch. Again, it is determined that the called party subscribes to this caller announce service. If so, the announcement generator is alerted, e.g. by SS7 signalling, and appropriate service logic is started. The local switch at 260 plays ringing to the caller and connects the called terminal to the announcement generator. Information about the caller may be derived from his CLID, for example, by the service logic at the local switch or perhaps at the announcement generator. In either case, at 270, the announcement generator generates a synthesised speech announcement containing or derived from this information. This speech is fed into the call path at the announcement generator to reach the subscriber line coupled to the customer's terminal. At 280, the local switch (or possibly the announcement generator) sends a specific control message to tell the customer terminal to go off-hook, and to connect its loudspeaker to the line. This can be done using the GR-30 message as described above, with another specific call qualifier.

The customer can then listen to the information in the verbal announcement and learn more to help decide whether to take the call or not. Notably, it is not necessary for the customer to take action such as lifting a receiver to listen or be alerted about the call. At 300, if the customer chooses to pick up the call, by lifting the handset or pressing a button, the customer is connected to the caller. The call continues until either party hangs up at 310. At 320, if the customer chooses not to take the call the terminal steps monitoring, and at 330 the caller is offered the possibility of being forwarded to the customer's voicemail. If this is accepted, the call is recorded until the caller hangs up. If the customer takes no action after a time-out 340, again the caller is offered voicemail 330.

To prevent the customer's being interrupted too often by this service, it is useful to have a mechanism to enable the service to be activated dependent on criteria selected by the customer. For example, the customer may wish to define that the service is triggered only on receipt of calls from specified callers, or at specified times, for example. This could be achieved by appropriate filtering by the service logic execution processor, based on preferences stored and retrieved by this processor. Alternatively, the announcement generator could be arranged to have similar capabilities.

In an alternative embodiment (not illustrated), instead of the announcement being generated from information about the telephone call, the caller is offered the opportunity to make a short announcement which will be passed to the customer's terminal directly, or recorded for replaying at the customer's terminal. Furthermore, there is an opportunity, at the time of the announcement, for brief advertising or information messages to be inserted.

Figure 10:
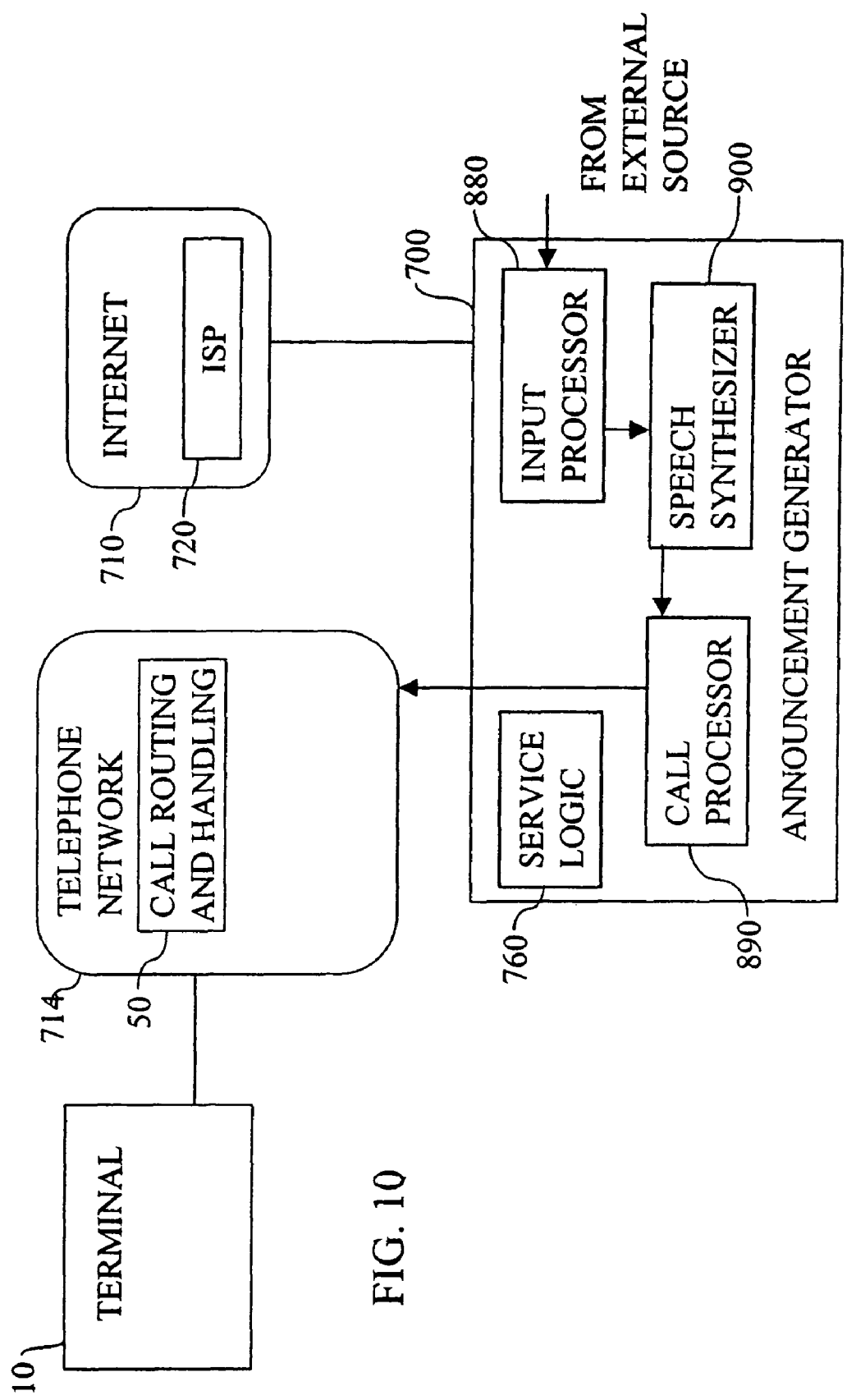
FIG. 10 shows an arrangement of elements in schematic form, for services using an external input.
Figure 11:
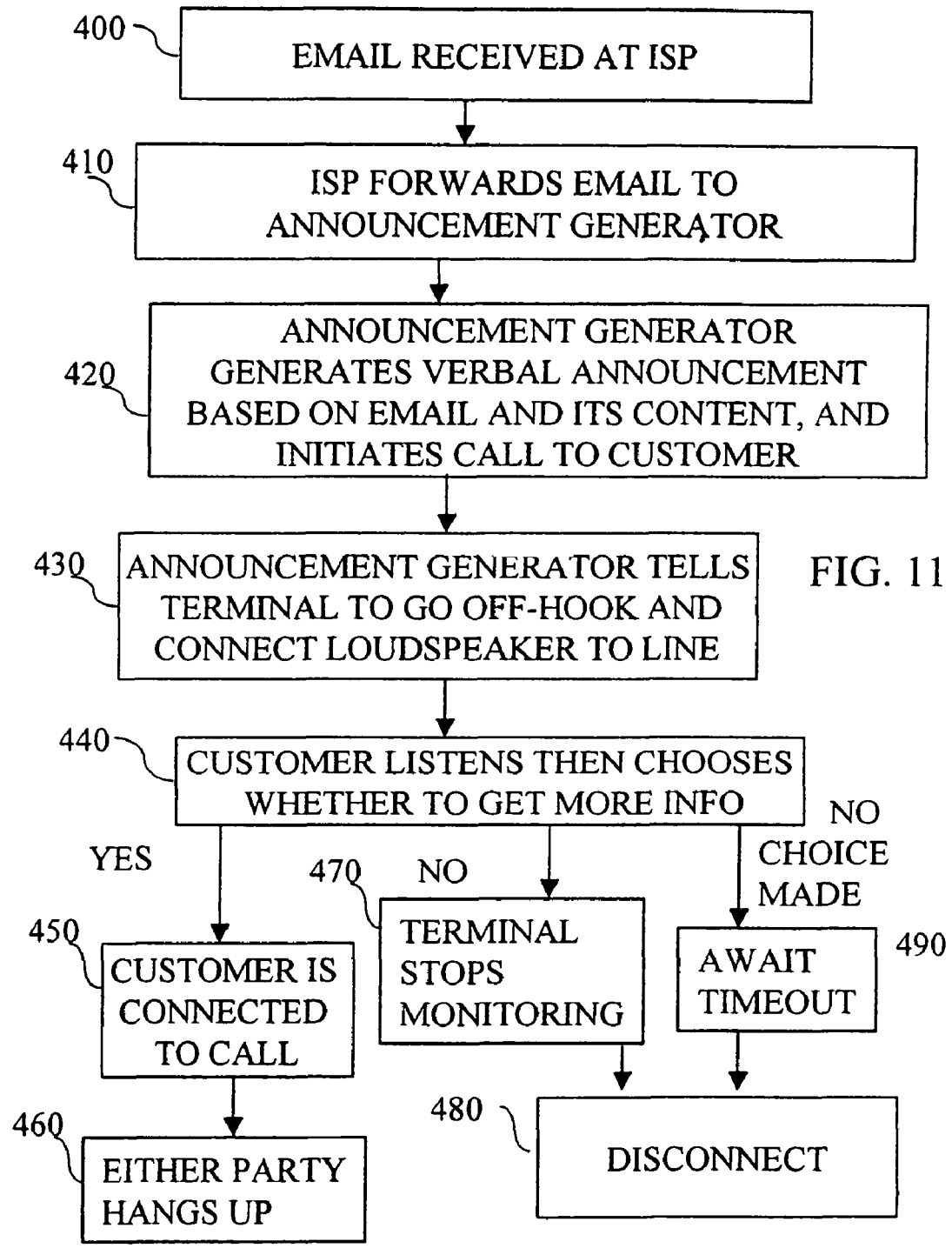
FIG. 11 shows a flow chart for an email received announcement service, which may use the arrangement of FIG. 10

FIGS. 10 and 11, Email Received Announcement Example

FIG. 10 shows in schematic form an arrangement similar to that of FIG. 2, and including the terminal 10, a telephone network 714, the announcement generator 700, and a connection to the Internet 710. This enables a service to be provided which can be influenced by predetermined events or make use of external information. The service logic 760, is conveniently located at the announcement generator in this case, although other locations are conceivable. An Internet Service Provider (ISP) 720, which may be anywhere on the Internet, is also shown.

The announcement generator 700 may be part of the network or may be external to the network. It is an example of a server which may be coupled to the network by a telephone line, and hence be in the call path. Thus it may generate and send the control message for controlling the terminal. It includes an input processor 880 for handling inputs from external sources, and extracting the content of messages and other information about the message, e.g. about the sender. The external sources may include other networks, such as the Internet, or other telephone lines, using modem or fax connections. A speech synthesiser 900 takes the data from the input processor and creates the verbal announcement according to this data. This may use a digital signal processor or other specialised hardware. Such devices are well known and need not be described here in more detail. The voice signal output by the speech synthesiser is fed to a call processor 890. This call processor can interface with the telephone network e.g. to initiate a telephone call or feed the voice signal into an existing call in the network, and thus make announcements which reach the customer terminal via the local switch. Again, this part can be implemented using well known techniques, and so need not be described herein more detail. The call processor, and other elements of the announcement generator, may be operating under the overall control of the service logic being executed on the local switch or the announcement generator, or both.

FIG. 11 shows a flowchart for one type of service which can make use of this arrangement. It enables a customer to be alerted by telephone when an event occurs relating to their own, or any particular email account serviced by the ISP. In the example shown, the customer is alerted to the receipt of email. The email is received at the ISP at step 400. The ISP determines that the customer is a subscriber to this email announcement service, and forwards the email to the announcement generator at step 410. The input processor of the announcement generator includes appropriate hardware and software to be able to receive and read the forwarded email. At 420, the announcement generator generates a verbal announcement based on the email and its content. Typically, this might include details of who sent the email, any summary information such as a title, and details of any attachment. If the email is short the content may be read out; if it is longer an indication of its length may be given.

At 420, the call processor of the announcement generator initiates a call to the customer, under the control of the service logic execution processor. At 430, the service logic and call processor at the announcement generator send a control message to the customer terminal to cause it to go off-hook and connect its loudspeaker to the line. At step 440, the customer can listen to the verbal announcement and choose whether to get more information by taking the call. According to the selection made, at 450 he is connected to the call. If the announcement generator were appropriately configured, it would be possible for the customer to give commands, e.g., by pressing keys on the terminal. The service logic at the announcement generator could be arranged to respond appropriately. This might enable a dialogue (not illustrated) to allow the announcement generator to tell the customer more information about the email or its contents upon request. It would be possible to arrange the announcement generator to pass commands back to the ISP to deal with the email, for example, to send a reply email to the sender.

If the customer chooses not to take the call at 470, the terminal stops monitoring and at 480 the call may be disconnected. An option to forward it to the customer's voicemail could be offered. If the customer takes no action after a time-out at 490, the call may disconnected or forwarded to another number or to the voicemail system, or a retry is arranged after a given time has elapsed.

To prevent the customer being interrupted too often by this service, it is useful to have a mechanism to enable the service to be activated dependent on criteria selected by the customer. For example, the customer may wish to define that the service is triggered only on receipt of emails from specified senders, or emails with a specified priority indication. This could be achieved by appropriate filtering by the service logic execution processor, based on preferences stored and retrieved by this processor. Alternatively, the announcement generator could be arranged to have similar capabilities.

Another way of implementing the call processing of this announcement service would be to have the ISP initiate the call to the customer using the well-known H323 standard for Internet telephony. In this case, the speech synthesizer could be coupled to the ISP and an H323 gateway could be used to couple the call to the local switch.

Figure 12:
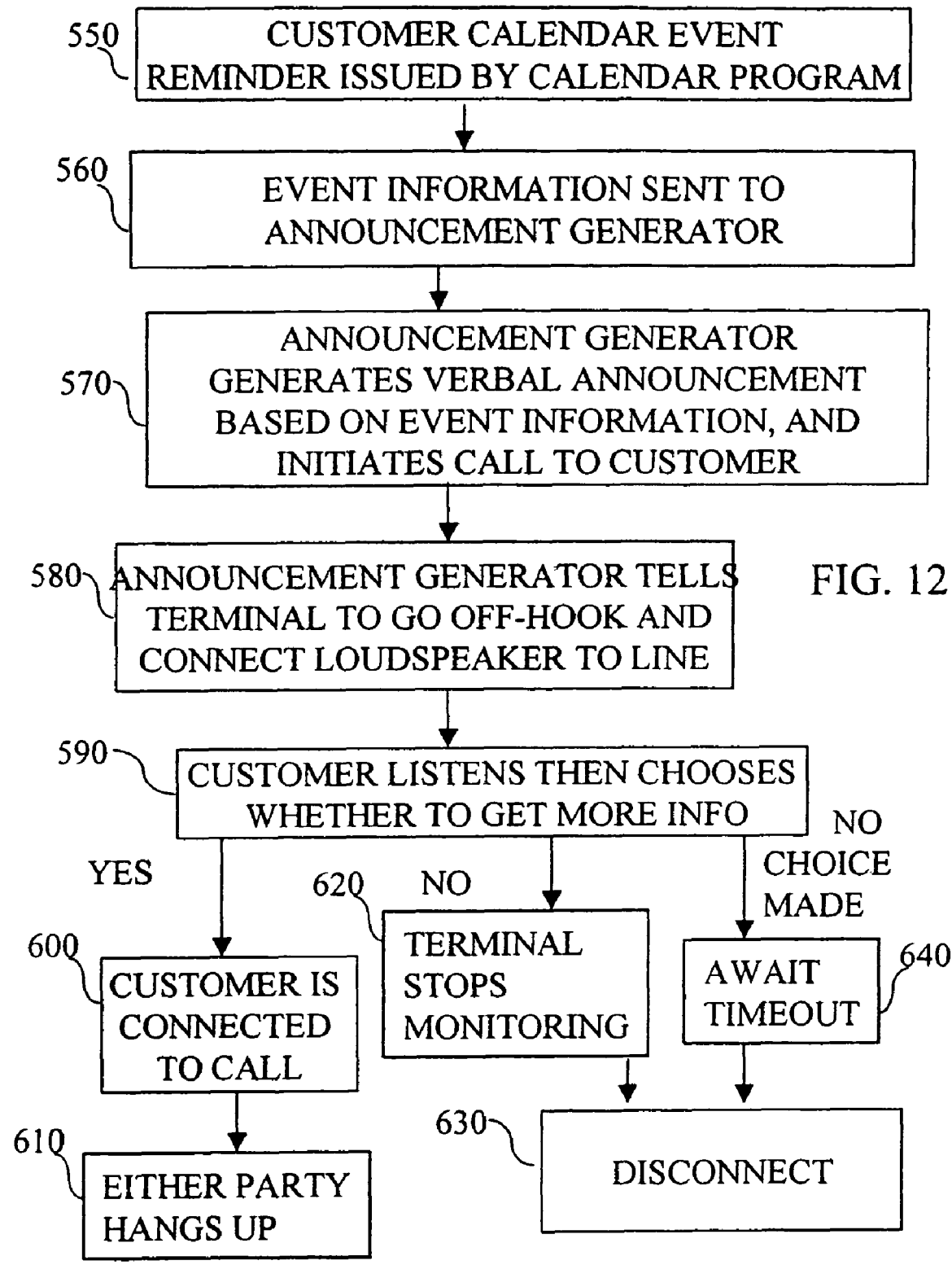
FIG. 12 shows a flow chart for another embodiment, for a calendar entry announcement service, which may use the arrangement of FIG. 10.

Calendar Entry Announcement Example, FIG. 12

FIG. 12 shows another example of a service triggered by a predetermined event. It may use the arrangement shown in FIG. 10. In this service the event is an external event, specifically a reminder generated by a calendar program. The program may be running on the customer's computer, or any other computer or computer network. This service enables a customer to be alerted by telephone of such a reminder. At 550, the calendar event reminder is issued by the calendar program, which may belong to the customer or to a related third party. The calendar program is arranged to send information about the reminder to the announcement generator at 560. This can be achieved by an email to the announcement generator as described above in relation to FIGS. 10 and 11. Other mechanisms can be conceived for coupling this information from the network to which the computer is attached to the telephone network.

At 570, the announcement generator generates a verbal announcement based on the event information, and initiates the call to the customer. At 580, the announcement generator sends a data message to the customer terminal to cause it go off-hook and to connect the loudspeaker to the line. This may use the GR30 message as described above. At 590, the customer listens to the verbal announcement of the calendar event and decides whether to get more information by taking the call. According to the selection made, the customer may be connected to the call at 600. As described above in relation to FIG. 11, this could give the customer the opportunity to interact with the announcement generator, to obtain more information about the calendar event, or to issue some commands on how to deal with the event. This call may continue until either party hangs up at 610.

The customer may choose not to take the call, in which case the terminal will stop monitoring at 620, and the call may be disconnected 630. If the customer makes no choice, after a time-out 640 the call may be disconnected or forwarded to another of the customer's numbers (not shown), or if appropriate to the voicemail system, or it may be arranged to call the customer again with the same announcement after a predetermined period.

Other Examples, Variations

Determining the script control message can encompass creating the control message according to stored instructions, or simply retrieving the control message from storage, or receiving the control message in one format and reformatting it to send on to the terminal, or a combination of these methods.

The terminal may be a single unit or its functions may be spread across a number of connected units. These may be dedicated adjuncts, or one or more general purpose computers such as desk-top or lap-top computers.

Similarly, the service logic at the network side can be distributed over a number of processors in different locations to suit the application.

Customer selection of criteria may enable the customer to limit loudspeaker alerting to only selected callers, or have verbal reminders of entries in the customer's calendar, or when a variable such as a stock price reaches a given value, for example.

Although the examples described above have not referred to wireless networks, the same advantages can be achieved for wireless networks. A skilled person would be able to take known wireless networks and make modifications corresponding to those described above to implement embodiments of the invention and achieve these advantages. For announcement type services, portable phones are particularly appropriate. It is easier for a customer to carry only one device, and ensure that attempts to contact him whether by fax, email or phone can all be directed to his phone.

Although the examples described above have not referred to Internet Protocol (IP) telephone calls, or calls over ISDN lines, again the same principles can be applied and modifications corresponding to those described above can be made.

Although the examples described use a ring splash to alert customer terminals which have no other indicator mechanism other than ringing, other distinctive ringing sequences could be used, or there may be no ringing at all.

References to control of a script are intended to encompass starting the script, terminating it, or influencing the course of it, e.g. by causing the script to take one branch where a choice is possible, or by interrupting the script. Such an interrupt may enable another action to be performed before returning to the script at the same place or jumping to a new place.

Other useful applications for loudspeaker type paging services include emergency alerts, e.g. for evacuation orders relating to a building or to a neighbourhood.

Many other types of services relating to calls, such as conferencing and call forwarding can be combined with the features of the present invention.

It will thus be seen that the invention efficiently attains the objects set forth above, among those made apparent from the preceding description. In particular, the invention provides reliable remote control of a telephone subscriber terminal functioning to announce and screen incoming calls and event notifications. Those skilled in the art will appreciate that the configurations depicted in FIGS. 1 through 12 provide these advantages.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A telephone set adapted to respond to detailed commands received from a telephone system, comprising:
   a receiver for receiving digital signals representing said detailed commands containing a predetermined script for execution on the telephone system;
   a digital processor programmed to filter said digital signals based on at least one preference stored by said digital processor and interpret said filtered digital signals and to control elements of said telephone set based on said predetermined script, thereby remotely controlling execution of said predetermined script by sending detailed commands from the telephone system to the telephone set;
   wherein said detailed commands are configured to specify a type of selected services to be run by the telephone set based on said preferences to prevent unwanted interferences between selected services;
   said detailed commands are adapted to control said telephone set to run said selected services in parallel with one another and/or to run some of said selected services while other ones of said selected services are not being run by said telephone set.

2. The telephone set according to claim 1 wherein said digital processor is programmed to interpret a call screening monitor interrupt (CSMI) detailed command and accordingly to direct the telephone set to go to an off-hook state and to receive voice data from an incoming call being recorded on a voice messaging system associated with the telephone set and to play said voice data through a loudspeaker of the telephone set.

3. The telephone set according to claim 2 wherein said digital processor is programmed to elicit instruction from a subscriber of the telephone set.

4. The telephone set according to claim 3 further including a display screen, and wherein said digital processor is programmed to elicit instruction from a subscriber by displaying soft keys on said display screen containing legends indicating:
   cessation of monitoring the incoming call; and
   interception of the incoming call.

5. The telephone set according to claim 4 wherein in response to user actuation of said soft key indicating cessation of monitoring the incoming call said digital processor returns the telephone set to an on-hook condition.

6. The telephone set according to claim 4 wherein in response to user actuation of said soft key indicating interception of the incoming call said digital processor establishes a two-way connection with the incoming call.

7. The telephone set according to claim 4 wherein if the incoming call terminates without actuation of either of said keys, said digital processor returns the telephone set to an on-hook condition.

8. The telephone set according to claim 4 wherein said digital processor is programmed to interpret a caller announce detailed command and accordingly to direct the telephone set to go to an off-hook state and to receive, from an announcement generator associated with the telephone system, voice data descriptive of an incoming call, and to play said voice data through a loudspeaker of the telephone set.

9. The telephone set according to claim 8 wherein said digital processor is programmed, in response to a subscriber's signaling willingness to accept said incoming call, to establish a two-way connection of the telephone set with said incoming call.

10. The telephone set according to claim 9 wherein a subscriber signals willingness to accept said incoming call by lifting a handset of the telephone set.

11. The telephone set according to claim 9 wherein a subscriber signals willingness to accept said incoming call by actuating a predetermined key on the telephone set.

12. The telephone set according to claim 8 wherein if said voice data descriptive of said incoming call terminates and a subscriber has not signaled willingness to accept said incoming call, said digital processor is programmed to return said telephone set to an on-hook condition.

* * * * *